United States Patent [19]
Roubinet

[11] 3,938,288
[45] Feb. 17, 1976

[54] REINFORCING DEVICE FOR AUTOMOBILE BODY

[75] Inventor: Pierre Roubinet, Billancourt, France

[73] Assignees: Regie Nationale des Usines Renault, Billancourt; Automobiles Peugeot, Paris, both of France

[22] Filed: Mar. 5, 1974

[21] Appl. No.: 448,199

[30] Foreign Application Priority Data
Mar. 6, 1973  France .............................. 73.07882

[52] U.S. Cl. .................. 52/615; 52/309; 52/223 R; 296/146
[51] Int. Cl.² ........................................ E04C 2/08
[58] Field of Search ........ 296/146, 76; 52/309, 727, 52/725, 615, 223, 224, 225, 226

[56] References Cited
UNITED STATES PATENTS

| | | | |
|---|---|---|---|
| 3,056,706 | 10/1962 | Knoppel | 52/309 |
| 3,327,441 | 6/1967 | Kelly | 52/727 |
| 3,429,758 | 2/1969 | Young | 52/309 |
| 3,449,881 | 6/1969 | Wilfert | 52/615 |
| 3,528,875 | 9/1970 | MacDonald | 52/618 |
| 3,533,203 | 10/1970 | Fischer | 52/223 |
| 3,551,237 | 12/1970 | Cox | 52/309 |
| 3,677,874 | 7/1972 | Sterrett | 52/309 |
| 3,718,364 | 2/1973 | Fischer | 296/146 |
| 3,791,693 | 2/1974 | Hellriegel | 296/146 |
| 3,813,098 | 5/1974 | Fischer | 52/727 |
| 3,813,837 | 6/1974 | McClain | 52/309 |

FOREIGN PATENTS OR APPLICATIONS

| | | | |
|---|---|---|---|
| 235,539 | 7/1959 | Australia | 52/309 |

*Primary Examiner*—Frank L. Abbott
*Assistant Examiner*—Henry Raduazo
*Attorney, Agent, or Firm*—Fleit & Jacobson

[57] ABSTRACT

This device for improving the safety of automotive vehicles comprises a structure adapted to be fitted in the lateral doors of the vehicle between the main panels thereof, said structure consisting of a sleeve member secured parallel to said panels in the direction of travel of the vehicle and anchored to the vertical edges of the door, and comprising a core with a peripheral winding made of glass yarn impregnated with resin and tensioned, the proportion of the component elements being 50 to 80 percent and preferably 70 percent of glass yarn, the balance consisting of resin.

8 Claims, 5 Drawing Figures

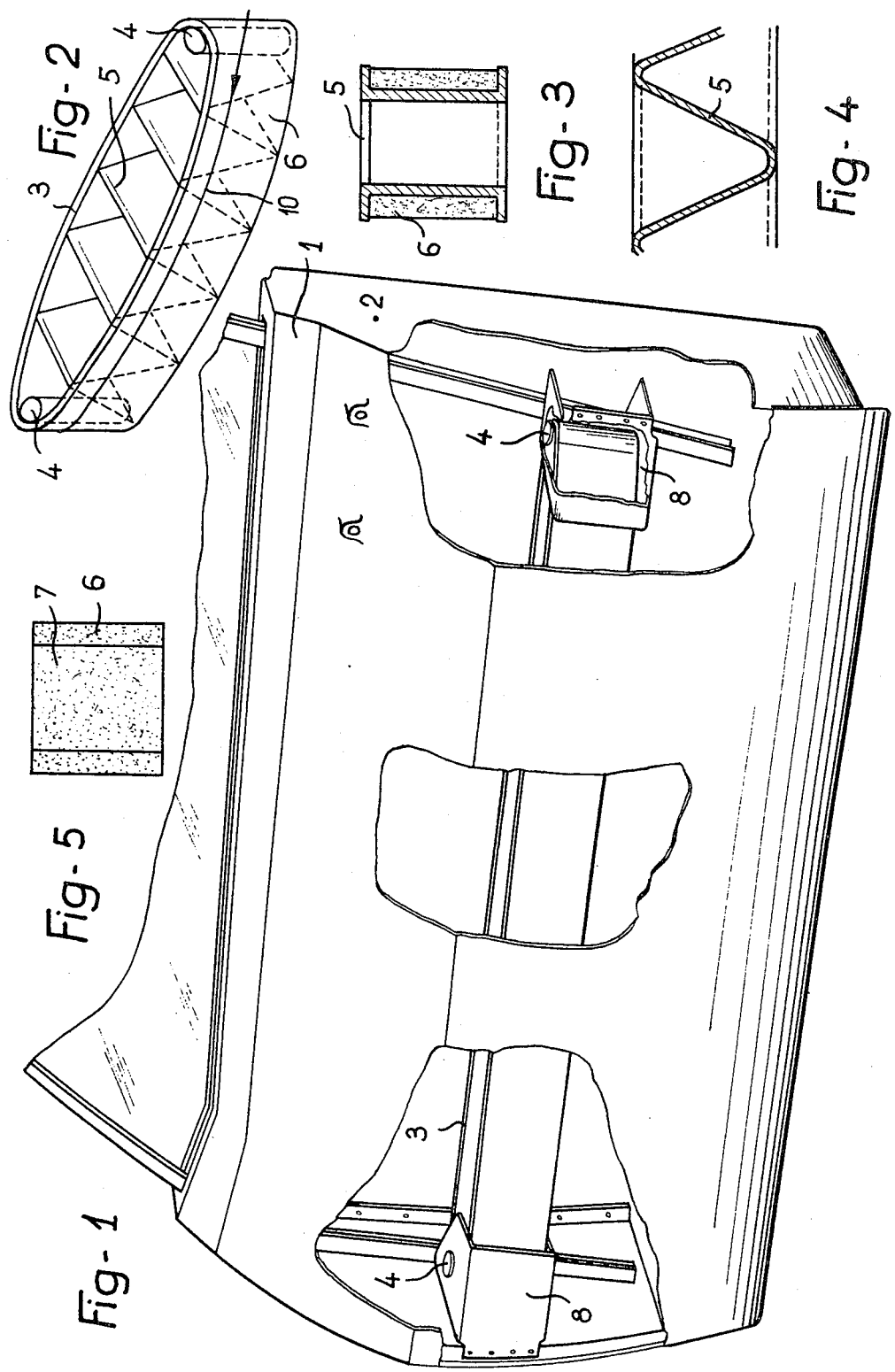

REINFORCING DEVICE FOR AUTOMOBILE BODY

The present invention relates in general to means for improving the lateral protection of motor vehicles, and is directed more particularly to a device for improving the protection of the side doors of such vehicles.

It is already known in the field of technical measures taken for improving the lateral protection of a motor vehicle in case of side crash to incorporate in the lateral doors of vehicles, behind the outer pressed door panels, lateral reinforcing members consisting of shaped metal plates. The use of these reinforcing members improved considerably the lateral protection of conventional motor vehicles by preventing any deep and dangerous penetration of one portion of another vehicle into the passenger compartment of the thus protected vehicle, for instance in case of a crash approximately at right angles between the two vehicles.

However, these known reinforcing elements consisting of shaped metal plates, although relatively effective, are objectionable on account of their considerable weight, which increases greatly the total weight of the vehicle if a protection of this character is used extensively throughout the vehicle.

Reinforcing elements in the form of strips tension stressed in planes substantially parallel to the door panels and consisting of a texture of synthetic material treated to cause its contraction are also known. However, the mechanical properties of these energy-absorbing devices are rather limited.

It is the essential object of the present invention to avoid the above-mentioned inconveniences while providing a considerable lateral protection at a low cost and without resorting to relatively heavy component elements.

According to this invention, the lateral protection device for motor vehicles, notably for the lateral doors of vehicles, is intended for fitting between the panel elements consituting each door and characterised in that it has a structure in the form of a rigid continuous strip in the form of an oval-like sleeve member secured parallel to said panels in the longitudinal direction of the vehicle and anchored to the vertical edges of the door, said structure comprising a core and a peripheral winding of glass yarn coated with resin and kept under tension stress, the proportions of said component elements being preferably in the range of about 70 % glass yarn, the balance consisting of resin.

Other features and advantages of this invention will appear as the following description proceeds with reference to the attached drawing, illustrating a typical embodiment of the invention. In the drawing:

FIG. 1 is a general perspective view of a vehicle door reinforced according to the present invention;

FIG. 2 illustrates a typical reinforcing element;

FIGS. 3 and 4 are sections taken along the transverse and longitudinal planes, respectively, of the reinforcing element, showing a detail thereof, and FIG. 5 illustrates a detail of the energy absorber according to this invention, shown in fragmentary cross-sectional view.

The vehicle door illustrated in FIG. 1 comprises essentially a pair of panels 1 and 2 between which the reinforcing element of the present invention is disposed. This element, as shown more in detail in FIG. 2, comprises a sleeve member 3 extending parallel to the panels in the general longitudinal direction of the vehicle. It is anchored to the vertical edges of the door by means of studs 4 and brackets 8.

The reinforcing elements according to the present invention are obtained as follows:

According to a first embodiment of the invention there is provided, a lost core of thermoplastic or thermosetting reinforced material such as a pre-impregnated material consisting of reinforcing fibres, for instance glass fibers, comprising a synthetic resin, such as polyesters or epoxy resins.

The shape of this core must be designed to enable it to partake in the stiffness of the element; to this end, it is given a zig-zag configuration or a cellular configuration obtained beforehand by moulding, as illustrated at 5 in FIGS. 2, 3 and 4.

On this core 5 a filament winding 6 is formed by using a yarn 10 under tension, this yarn being impregnated with polymerizable synthetic resin similar to those mentioned hereinabove, and subsequently set.

In a modified embodiment of the invention (FIG. 5), the core consists either of a lost core of relatively light construction, of which the only function is to permit the filament winding, or a detachable core, possibly expansible to facilitate the stripping (for example in the form of a plurality of stainless-steel sections, or inflatable sections of rubberized fabric coated with silicones) on which, as in the preceding example, a filament winding 6 of glass yarn impregnated with polymerizable resin is formed and eventually set.

Then, while preserving the lost core or removing the detachable core, the cavity thus obtained is filled with a material 7 forming a rigid or semi-rigid foam, such as polyurethane or polyvinylchloride (PVC), or self-hardening resins containing a filler such as mineral or organic powders, or semi-finished fillers such as expanded fillers, glass balls, etc . . . .

By way of example, a structure obtained by applying the filament-winding method by means of E-grade glass yarn having a diameter of 8 to 14$\mu$, is filled with rigid polyurethane having a density approximating 50 to 200 gramms per liter, by reason of 70 % of glass fibres and 30 % of catalysed resin. The element has the following direction:

| | | |
|---|---|---|
| Total length | : | 80 centimeters |
| Total thickness | : | 5 cm |
| Strip width | : | 8.5 cm |
| Strip thickness | : | 0.4 cm. |

This structure, submitted to shock tests, is capable of absorbing 1,250 Joules (29,630 ft.pdl) and withstanding a pressure of 50,000 N (362,000 poundals) with a 50-mm sag.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. A reinforced motor vehicle door for protecting a motor vehicle against lateral impact comprising:
spaced apart main door panels forming inner and outer walls of the motor vehicle door and secured to rigid door frame members;
protecting means mounted on said frame members disposed between said main door panels for imparting lateral protection to the motor vehicle door, said protecting means including a structure comprising a rigid strip having inner and outer walls and which is in the form of a sleeve having an oval-like longitudinal cross-section and mounted on the motor vehicle door for pivotal movement therewith with said longitudinal axis oriented essentially parallel to the general longitudinal direction of the motor vehicle, a core in reinforcing engagement with said inner walls of said rigid strip and a peripheral winding of filamentary material about said core constituting said rigid strip and comprising resin impregnated glass fibers under tension, said peripheral winding being composed of approximately 50 to 80% glass yarn and the remainder resin.

2. The reinforced motor vehicle door according to claim 1, characterized in that said core is formed with rigid or semi-rigid foam having a density of 50 to 200 grams per liter.

3. The reinforced motor vehicle door according to claim 1, characterized in that said core comprises a lost core consisting of a reinforced glass-fiber material impregnated with setting resin and molded to a zig-zag or cellular configuration.

4. The reinforced motor vehicle of claim 1 wherein said peripheral winding is composed of 70% glass yarn.

5. The reinforced motor vehicle door of claim 2 wherein said foam is selected from the group consisting of polyurethane, PVC and a self-setting resin composition containing a filler or reinforcing agents.

6. The reinforced motor vehicle door of claim 1 wherein said core is a detachable core.

7. The reinforced motor vehicle door of claim 1 wherein said rigid strip is essentially ellipsoidally shaped.

8. The reinforced motor vehicle door of claim 1 wherein said transverse axis of said rigid strip is oriented essentially perpendicularly to the planes of said main door panels.

* * * * *